United States Patent
Yamaji et al.

(10) Patent No.: US 8,707,154 B2
(45) Date of Patent: Apr. 22, 2014

(54) APPARATUS, METHOD, AND RECORDING MEDIUM FOR CREATING CONTENT-DOCUMENT REPRODUCTION DATA

(75) Inventors: Kei Yamaji, Kanagawa (JP); Kazuhiro Mino, Kanagawa (JP)

(73) Assignee: Facebook, Inc., Menlo Park, CA (US)

( * ) Notice: Subject to any disclaimer, the term of this patent is extended or adjusted under 35 U.S.C. 154(b) by 374 days.

(21) Appl. No.: 12/510,587

(22) Filed: Jul. 28, 2009

(65) Prior Publication Data

US 2010/0031132 A1 Feb. 4, 2010

(30) Foreign Application Priority Data

Jul. 30, 2008 (JP) ................................. 2008-196481

(51) Int. Cl.
*G06F 17/00* (2006.01)
(52) U.S. Cl.
USPC ............ 715/203; 715/201; 715/202; 715/730
(58) Field of Classification Search
None
See application file for complete search history.

(56) References Cited

U.S. PATENT DOCUMENTS

| | | | |
|---|---|---|---|
| 6,404,978 B1* | 6/2002 | Abe | 386/281 |
| 2002/0032702 A1* | 3/2002 | Horii | 707/515 |
| 2004/0186723 A1* | 9/2004 | Mizutani et al. | 704/270.1 |
| 2005/0183000 A1* | 8/2005 | Mei | 715/500.1 |
| 2006/0294453 A1* | 12/2006 | Hirata | 715/500.1 |
| 2007/0048715 A1 | 3/2007 | Miyamoto et al. | |
| 2007/0118801 A1* | 5/2007 | Harshbarger et al. | 715/730 |
| 2010/0036664 A1 | 2/2010 | Miyamoto et al. | |

FOREIGN PATENT DOCUMENTS

| | | |
|---|---|---|
| JP | 2001-282414 | 10/2001 |
| JP | 2004-287595 | 10/2004 |
| JP | 2005-244407 | 9/2005 |
| JP | 2005-328516 | 11/2005 |
| JP | 2006-178087 | 7/2006 |
| JP | 2007-235734 | 9/2007 |
| JP | 2008-98955 | 4/2008 |

OTHER PUBLICATIONS

"Blog Digest" URL; http://www.storyz.jp/bd/ (together with the English translation thereof).
Notification of Reasons for Rejection issued Feb. 2, 2012 by the Japanese Patent Office in Japanese Patent Application No. 2008-196481, 8 pages.
Notification of Reasons for Rejection issued on Apr. 20, 2012 by the Japanese Patent Office in the corresponding Japanese Patent Application No. 2008-196481.

* cited by examiner

*Primary Examiner* — Stephen Hong
*Assistant Examiner* — Keith Bloomquist
(74) *Attorney, Agent, or Firm* — Sheppard Mullin Richter & Hampton LLP

(57) ABSTRACT

In a slideshow which reproduces a content associated with comment information, the reproduction timing of the content can be controlled according to the reproduction timing of the comment information. In a reproduction table, the following are associated with each other: reproduction order; image-document combinations indicated by an image (or the identification information of the image, such as a JPEG file name) and a document (or the identification information of the document, such as a TXT file name); the number of characters in the document; and reproduction time of the image and the document identified by the identification information of the image and the document, respectively. The greater the number of characters the document has, the longer the reproduction time the image associated with the document has. Not every image needs to be associated with the document. For example, basic reproduction time of 5 seconds is assigned to image No. 3.

16 Claims, 14 Drawing Sheets

| No | IMAGE | COMMENT | REPRODUCTION TIME | |
|---|---|---|---|---|
| 1 | IMAGE1.JPG | FRI. JAN. 23 TRIP TO KYOTO. I WENT TO KINKAKUJI......... | 38 SECONDS | |
| 2 | IMAGE2.JPG | | 5 SECONDS | |
| 3 | IMAGE3.JPG | | 5 SECONDS | COMMENT-ACCOMPANIED IMAGE GROUP |
| 4 | IMAGE4.JPG | | 5 SECONDS | |
| 5 | IMAGE5.JPG | | 5 SECONDS | |
| 6 | IMAGE6.JPG | SCENERY SEEN FROM BUS. | 14 SECONDS | |

FIG.3

| No | IMAGE | COMMENT | NUMBER OF CHARACTER SEQUENCES IN COMMENT | SLIDESHOW REPRODUCTION TIME |
|---|---|---|---|---|
| 1 | xxxxxxxx.JPG | ……… | 21 CHARACTERS | 26 SECONDS |
| 2 | xxxxxxxx.JPG | ……… | 34 CHARACTERS | 39 SECONDS |
| 3 | xxxxxxxx.JPG | — | 0 CHARACTERS | 5 SECONDS |
| 4 | xxxxxxxx.JPG | ……… | 10 CHARACTERS | 15 SECONDS |
| 5 | xxxxxxxx.JPG | ……… | 15 CHARACTERS | 20 SECONDS |
| 6 | xxxxxxxx.JPG | ……… | 11 CHARACTERS | 16 SECONDS |

R1 IMAGE DISPLAY REGION

R2 CHARACTER DISPLAY REGION

R1 IMAGE DISPLAY REGION

R2 CHARACTER DISPLAY REGION

| No | IMAGE | COMMENT CHARACTER SEQUENCE |
|---|---|---|
| 1 | IMAGE1.JPG | FRI. JAN. 23 TRIP TO KYOTO.<br>I WENT TO KINKAKUJI.........<br>I WENT TO GINKAKUJI......... |
| 2 | IMAGE2.JPG | |
| 3 | IMAGE3.JPG | |
| 4 | IMAGE4.JPG | |
| 5 | IMAGE5.JPG | |
| 6 | IMAGE6.JPG | SCENERY SEEN FROM BUS. |

| NUMBER OF CHARACTER SEQUENCES IN COMMENT | NUMBER OF IMAGES DISPLAYABLE CONCURRENTLY |
|---|---|
| 0 TO 9 CHARACTERS | 5 images |
| 10 TO 20 CHARACTERS | 4 images |
| 21 TO 30 CHARACTERS | 2 images |
| 31 CHARACTERS OR MORE | 1 image |

FIG.15

| No | IMAGE | COMMENT | REPRODUCTION TIME |
|----|-------|---------|-------------------|
| 1 | IMAGE1.JPG | FRI. JAN. 23 TRIP TO KYOTO. I WENT TO KINKAKUJI........ I WENT TO GINKAKUJI........ | 8 SECONDS |
| 2 | IMAGE2.JPG | | 8 SECONDS |
| 3 | IMAGE3.JPG | | 8 SECONDS |
| 4 | IMAGE4.JPG | | 8 SECONDS |
| 5 | IMAGE5.JPG | | 8 SECONDS |
| 6 | IMAGE6.JPG | SCENERY SEEN FROM BUS. | 14 SECONDS |

COMMENT DISPLAY IS FIXED AND ONLY IMAGES ARE CHANGED

| No | IMAGE | COMMENT |
|---|---|---|
| 1 | xxxxxxxx.JPG | FRI. SAN. 23 TRIP TO KYOTO. |
| 2 | xxxxxxxx.JPG | I WENT TO KINKAKUJI....... |
| 3 | xxxxxxxx.JPG | I WENT TO GINKAKUJI......... |
| 4 | xxxxxxxx.JPG | I ATE XXX FOR LUNCH....... |
| 5 | xxxxxxxx.JPG | |
| 6 | xxxxxxxx.JPG | SCENERY SEEN FROM BUS. |

FIG.18

| No | IMAGE | COMMENT | NUMBER OF CHARACTERS | TIME REQUIRED TO READ COMMENT [S] |
|---|---|---|---|---|
| 1 | IMAGE OF KYOTO.JPG | FRI. JAN. 23 TRIP TO KYOTO. | 13 | 6 |
| 2 | IMAGE OF KINKAKUJI.JPG | I WENT TO KINKAKUJI ............ | 43 | 21 |
| 3 | IMAGE OF GINKAKUJI.JPG | I WENT TO GINKAKUJI......... | 23 | 11 |

| No | IMAGE | COMMENT |
|----|-------|---------|
| 1 | KYOTO.JPG | FRI. JAN. 23 TRIP TO KYOTO. |
| 2 | KINKAKUJI.JPG | I WENT TO KINKAKUJI......... |
| 3 | GINKAKUJI.JPG | I WENT TO GINKAKUJI......... |
| 4 | LUNCH.JPG | I ATE XXX FOR LUNCH....... |
| 5 | AFTER LUNCH.JPG | |
| 6 | xxxxxxxxx.JPG | SCENERY SEEN FROM BUS. |

| No | IMAGE | COMMENT |
|----|-------|---------|
| 1 | KYOTO.JPG | FRI. JAN. 23 TRIP TO KYOTO. |
| 2 | KINKAKUJI.JPG | I WENT TO KINKAKUJI......... |
| 3 | GINKAKUJI.JPG | I WENT TO GINKAKUJI......... |
| 4 | LUNCH.JPG | I ATE XXX FOR LUNCH................. |
| 5 | AFTER LUNCH.JPG | ................................ |
| 6 | xxxxxxxxx.JPG | SCENERY SEEN FROM BUS. |

APPARATUS, METHOD, AND RECORDING MEDIUM FOR CREATING CONTENT-DOCUMENT REPRODUCTION DATA

BACKGROUND OF THE INVENTION

1. Field of the Invention

The present invention relates to an apparatus, method and program for creating data with which a content and a document are synchronously displayed. The present invention also relates to a recording medium for the program.

2. Description of the Related Art

In Japanese Patent Application Laid-Open No. 2005-328516, when image data read from a recording medium is recorded on a DVD-R, metadata describing various pieces of information about the image data is recorded along with the image data. With the use of user image data, the metadata is updated by adding the number of access times, a display time, and the like. A value of the image data is calculated from the updated metadata and image data in a slideshow format is generated from the image data in a way that the reproduction time is extended as the value increases.

In Japanese Patent Application Laid-Open No. 2007-235734, an apparatus for creating slide display data includes a reading device that reads a plurality of image data and comment information attached to each of the individual image data, and a data creating section that creates data in a record format in which the image data and the comment information attached to each of the image data are combined and displayed in a slide format.

"Blog Digest", searched on Jun. 19, 2008, URL http://www.storyz.jp/bd/discloses a technology to create a slideshow based on uploaded images and the title of articles in blogs.

U.S. Pat. No. 5,810,603 is a prior art of music apparatuses in which a visual effect is imparted to lyrics displayed on a screen according to the progress of musical accompaniments.

SUMMARY OF THE INVENTION

Slideshows are created based on digital images in various ways, all of which involve substantial time and effort to input comment information that is displayed concurrently with the images. Japanese Patent Application Laid-Open No. 2007-235734 also suffers from cumbersome tasks for users to input comments for each image. Information, such as a photographing date, created by using Exif tag can be automatically inserted as a comment; however, it is hardly said that a slideshow very attractive to users can be created using only such information.

Meanwhile, the number of users who use websites like diary called "weblogs (blogs)" has increased in recent years, and thus there are many users who hourly update their diaries with images on the blogs using their mobile phones and the like. Creating a slideshow based on images and diaries on such a blog can eliminate an additional comment-input operation from a user to provide the slideshow with comments.

Regarding this point, in "Blog Digest", searched on Jun. 19, 2008, URL http://www.storyz.jp/bd/, only some comments in a blog are used in a slideshow and therefore not all the comments are displayed. In the blog, a user inputs many sentences on a daily basis; however, when only some sentences in the blog are used for the slideshow, the originality of the sentences may be lost.

Rather than a slideshow in which an image serves as the main part and a brief document serves as a subordinate part as disclosed in "Blog Digest", searched on Jun. 19, 2008, URL http://www.storyz.jp/bd/, a slideshow in which the whole document is displayed and the image is subordinated thereto may be created. In this case, however, the synchronism between the reproduction timings of the image and the document becomes a problem. As disclosed in the Japanese Patent Application Laid-Open No. 2005-328516, if the reproduction time is controlled according to the importance of an image, the display time of a document depends on the detail of the image, so that not the whole document may be displayed.

An object of the present invention is, in a slideshow which reproduces a content associated with comment information, to allow control of the reproduction timing of the content according to the reproduction timing of the comment information.

An apparatus for creating content-document reproduction data according to the present invention includes: a content acquiring section that acquires a content; a document acquiring section that acquires a document; an association data creating section that creates combination data defining a combination of a content and a document to be synchronized for reproduction, out of the contents acquired by the content acquiring section and the documents acquired by the document acquiring section; a reproduction time determining section that determines reproduction order and reproduction time of a content-document combination defined by the combination data created by the association data creating section; and a reproduction control data creating section that creates reproduction control data describing the combination data, and the reproduction order and the reproduction time of the content-document combination defined by the combination data, wherein the reproduction time determining section determines the reproduction time of each content-document combination defined by the combination data according to an amount of the document associated with each content defined by the combination data.

The reproduction time determining section includes: a document reproduction time determining section that determines reproduction time of a document acquired by the document acquiring section according to an amount of the document; and a content reproduction time determining section that determines reproduction time of a content acquired by the content acquiring section, and the content reproduction time determining section determines a reproduction starting time of each of contents in combination with the document to be a desired time within the reproduction time of the document.

According to the present invention, during the reproduction of a document, a plurality of contents associated with the document is sequentially changed for each reproduction. Therefore, a situation can be avoided in which the same content for a long document keeps being displayed causing users to be bored. Note that any content including reproducible visual information along the time axis may be sufficient, and each content may be either a still image or a moving image, and either digital data or analog data.

An apparatus for creating content-document reproduction data according to the present invention further includes: a content association word setting section that sets an association relation between each word in the document and each content; and a reading speed setting section that sets a reading speed of the document, wherein the content reproduction time determining section calculates a time duration in which a reading point reaches each word in the document based on the reading speed set by the reading speed setting section and then sets the reproduction starting time of each content associated with each word in the document set by the content association word setting section to be the time at which the reading point reaches the word.

In this way, the description of the document being read agrees with the description of the content(s), which effectively helps users recall their memories.

The content association word setting section sets an association between a content with auxiliary information and a word in the document in common with the auxiliary information.

The apparatus for creating content-document reproduction data according to the present invention includes a document dividing section that, when the document acquired by the document acquiring section has words the number of which is not less than a predetermined threshold, divides the document into a plurality of documents having words the number of which is less than the predetermined threshold.

In this way, a long document can be divided to increase the visibility.

The document acquiring section acquires the document from content-document display data defining a display layout of the document and the content, and the content acquiring section acquires the content a display layout of which is defined by the content-document display data.

The display layout of the document and the content is described in a markup language (such as HTML and XML).

The association data creating section creates combination data defining a combination of a content and a document according to a positional relation on the display layout of the content and the document defined by the content-document display data.

The reproduction control data includes information about the display layout defined by the content-document display data.

The information about the display layout includes at least one of a display size of the content, a display position of the content, a display region size of the document, a character size, a font of the document, and a color of the document.

An apparatus for creating content-document reproduction data according to the present invention further includes a layout determining section that determines a display layout of the content-document combination defined by the combination data and outputs layout information indicating the determined display layout, wherein the reproduction control data creating section creates reproduction control data in which the combination data, and the reproduction order and the reproduction time of the content-document combination defined by the combination data, and the layout information are associated with each other.

The layout determining section determines a display size of the content-document combination defined by the combination data according to an amount of the document associated with each content defined by the combination data.

The association data creating section determines one or more contents to be associated with the document according to the amount of the document and then creates combination data defining a combination of the document and the one or more contents to be associated with the document.

In this way, for example, the number of contents to be displayed along with the document can be adjusted by associating one document with many contents when the document is short or one document with fewer contents when the document is longer so that the contents do not obstruct the document arrangement.

An apparatus for creating content-document reproduction data according to the present invention further includes a reproduction section that sequentially reproduces each content and each document according to the reproduction order and the reproduction time of the reproduction control data.

An method for creating content-document reproduction data according to the present invention causes a computer to perform the steps of: acquiring a content; acquiring a document; creating combination data defining a combination of a content and a document to be synchronized for reproduction, out of the acquired contents and the acquired documents; determining reproduction order and reproduction time of a content-document combination defined by the created combination data; creating reproduction control data describing the combination data, and the reproduction order and the reproduction time of the content-document combination defined by the combination data; and determining the reproduction time of each content-document combination defined by the combination data according to an amount of the document associated with each content defined by the combination data.

The present invention also includes a program for creating content-document reproduction data embodied on a computer-readable medium, causing a computer to perform the method for creating content-document reproduction data.

The present invention also includes a recording medium in which computer readable code of the above program is stored.

According to the present invention, a content and a document are acquired from various sources and data is created for synchronously reproduce the content and the document. At this time, since the reproduction time of the content and the document is determined according to the length of the document, a situation can be avoided in which short reproduction time is assigned to long sentences so that the following content and document are displayed before a user finishes reading the document. Alternatively, a situation can be avoided in which long reproduction time is assigned to short sentences so that the same document and the content keep being displayed even after the enough time for a user to finish reading the document has elapsed giving a sluggish impression to the user.

BRIEF DESCRIPTION OF THE DRAWINGS

FIG. 3 is a diagram showing an example of a reproduction table;

FIG. 15 is a diagram showing an example of a reproduction table in which a plurality of images sequentially reproduced in association with one document is defined;

FIG. 18 is a diagram showing an example of a reproduction table in which an image associated with a time required to read each comment is reproduced;

DETAILED DESCRIPTION OF THE PREFERRED EMBODIMENTS

First Embodiment

Figure 1:
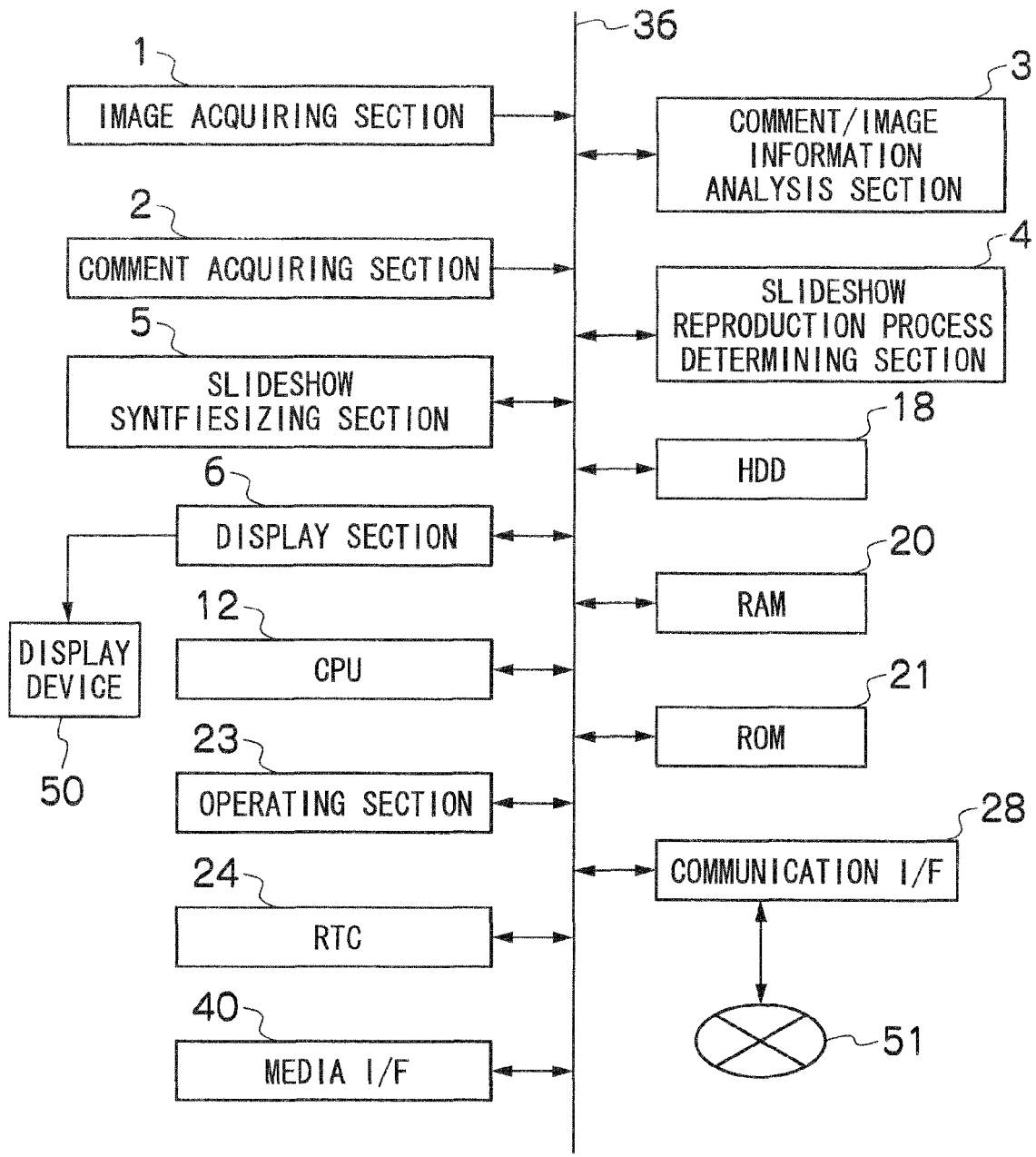
FIG. 1 is a block diagram showing a schematic configuration of a an apparatus for creating slideshow.

FIG. 1 is a block diagram showing a schematic configuration of a slideshow creating apparatus 100 according to a preferred embodiment of the present invention. The slideshow creating apparatus 100 includes an image acquiring section 1, a comment acquiring section 2, a comment/image information analysis section 3, a slideshow reproduction process determining section 4, a slideshow synthesizing section 5, a display section 6, a CPU 12, a hard disk 18, a RAM 20 and a ROM 21. These blocks are connected with each other via a bus 36. The slideshow creating apparatus 100 can be made up of a personal computer, a mobile phone, a PDA or the like which are commercially available.

The image acquiring section 1 acquires image data in a resource indicated by image-linked document data (such as HTML data indicating a document with a body tag and an image with an img tag, and data created by "Microsoft-Word"®) stored in a blog server connected via a network 51, a personal computer, or a mobile phone, as well as various recording media such as a CD, a DVD, and a memory card provided in a reading device of a media I/F 40. Information indicating the association between the image data (it may be either a still image or a moving image, and also may have voice information synchronously reproducible with a video image) and the document data can be embedded in the image-linked document data. The example of information indicating the association between the image data and the document data includes an img alt attribute indicating a description of the image. The image acquiring section 1 stores the acquired image data in the HDD 18.

The comment acquiring section 2 acquires document data (comment information) indicated by the image-linked document data and stores the document data in the HDD 18.

The image acquiring section 1 and the comment acquiring section 2 do not have to be completely separated and they may commonly acquire data from integrated hardware, such as a network card and a USB port. In the case of a blog or a web page described in HTML data, for example, the HTML data is received from a blog server to which a communication I/F 28 connects via the network 51, the comment acquiring section 2 then acquires this HTML data as comment information by selecting text indicated by a body tag in the HTML data, and the image acquiring section 1 acquires image data stored at a position indicated by an img tag in the HTML data. The description language for comment information can be any language. Further, original layout information of the document and the image (such as a width attribute, a height attribute, and a align attribute of the img tag, a font color attribute of a font tag, and a P align tag) is acquired from the HTML data.

The comment/image information analysis section 3, the slideshow reproduction process determining section 4, and the slideshow synthesizing section 5 are so-called co-processors and take charge of each dedicated processing to help the CPU 12 with the processing operation. The detail of the processing will be described later. It is needless to say that each of these sections may be a function as the one performed by the CPU 12 and each detail of processing does not depend on any particular hardware configuration.

The display section 6 is a video encoder which converts slideshow data synthesized by the slideshow synthesizing section 5 into a video signal, for example, one in accordance with the NTSC scheme and outputs the signal to a display device 50 such as a liquid crystal display. The slideshow data synthesized by the slideshow synthesizing section (including a document, an image, and a reproduction table described later), however, may be recorded in a recording medium such as a memory card, a DVD, or a CD-R and read out from the recording medium using other personal computer or mobile phone to be reproduced.

The CPU 12 collectively controls each section of the apparatus according to an operation program stored in the HDD 18 or the ROM 21. The HDD 18 stores a program controlling the slideshow creating apparatus 100, still/moving images, a reproduction table and the like. These programs are stored in the HDD 18 or the ROM 21 as computer readable code.

The slideshow creating apparatus 100 is operated by a operating section 23 including pointing devices indicative the moving of a pointer (cursor) of a mouse, a touch pad, a truck ball or the like, and various operating devices such as a touch panel, a ten-key numeric pad, an arrow key pad, and a keyboard.

The display section 6 creates a video signal of a pointer moving on the window according to input operations including instructions of the moving direction and the moving speed from the operating section 23 and outputs the video signal to the display device 50. The CPU 12 starts or ends various processing according to input operations from the operating section 23.

The RAM 20 functions as a working memory when the CPU 12 performs various processing. The slideshow creating apparatus 100 further includes the communication I/F 28 for connecting various electronic devices via the network 51. The slideshow data synthesized by the slideshow synthesizing section 5 is encoded according to a moving image compression format such as the MPEG 4 scheme, and the reproduction data of the slideshow can be streaming delivered to a personal computer or a mobile phone which has got connected via the communication I/F 28. An RTC 24 is a circuit for outputting time information.

Figure 2:
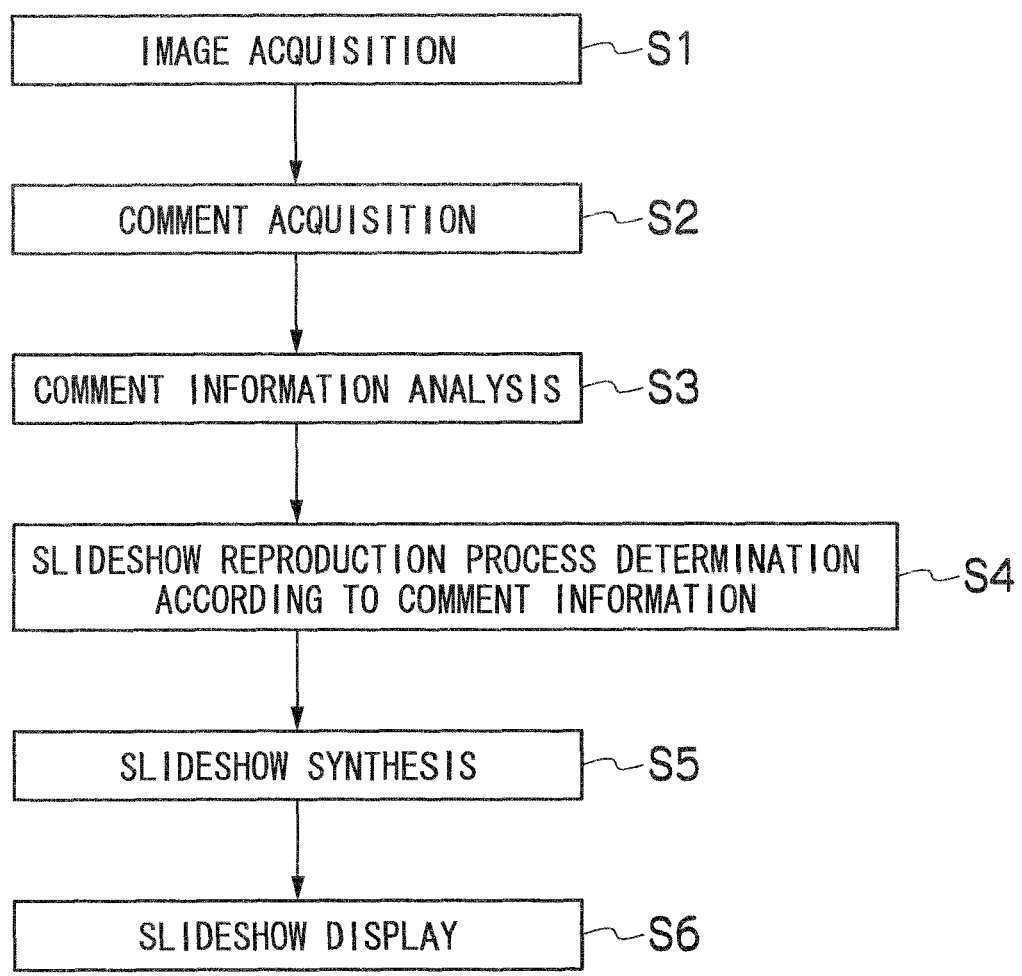
FIG. 2 is a flow chart of processing of creating a slideshow.

FIG. 2 is a flow chart of processing of creating a slideshow implemented in the slideshow creating apparatus 100.

In S1, the image acquiring section 1 acquires an image based on image-linked document data.

In S2, the comment acquiring section 2 acquires a document based on the image-linked document data.

In S3, the comment/image information analysis section 3 acquires information indicating a layout of the document and the image (layout information) from the image-linked document data. The layout information includes a display size of the image, a display position of the image, a display region size of the document, a character size, a font and a color of the document. The comment/image information analysis section 3 specifies the association between the image(s) and the document based on the layout information. This processing will be described later. The comment/image information analysis section 3 counts the number of characters in the document associated with each image. These processes are repeated for all images.

In S4, the slideshow reproduction process determining section 4 determines the reproduction time of each image and the document associated to the image based on the number of characters in the document associated with the image. For example, the slideshow reproduction process determining section 4 determines that 'the reproduction time (sec) of the document and the image(s)=the basic reproduction time(5)+ the number of characters in the document×1.' When one unit of a document (for example, a diary for one day) is associated with a plurality of images, the section 4 may determine that 'the reproduction time (see) of the document and the image(s)=the basic reproduction time(5)+the number of characters in the document×1+the number of images×1.'

Alternatively, the reproduction time may be determined according to a reading speed (for example, WPM; Words Per Minute, which shows the number of minutes required to read one word) because the reading speed varies depending on the person. For example, it is said that the average reading speed of a typical Japanese is 400 to 600 words per minute for a document written in Japanese. Then, 'the reproduction time (min) of the document and the image(s)=the basic reproduction time(5)+the number of words in the document×60/the reading speed (for example, 400 words/min)' may be set. Alternatively, it is said that the average reading speed of a typical American is 250 to 300 WPM for a document written in English. Then, 'the reproduction time (min) of the document and the image(s)=the basic reproduction time(5)+the number of words in the document/the reading speed (for example, 250 WPM)' may be set. It is further preferable that a reading speed of the reproduction time calculation formula can be arbitrarily set from the operating section 23 so that each user can keep pace with the progress of the slide show at their own reading speed.

Alternatively, the reproduction time may be determined by taking the number of lines in a document into account. For example, it takes much time to read a document having many linefeeds, and therefore the number of linefeeds×0.5 seconds is added to the reproduction time obtained by the reproduction time calculation formula described above and the result is set as the final reproduction time.

Further alternatively, the reproduction time may be determined by taking the display size of the document into account. For example, it is easy to read large characters and takes much time to read small characters, and therefore a correction factor α inversely proportional to the character size (i.e., as a character size becomes larger, a value becomes smaller; for example, a value obtained by multiplying the inverse of the number of character point by 10) is multiplied by the reproduction time obtained by the reproduction time calculation formula and the result is set as the final reproduction time.

Still further alternatively, the reproduction time may be determined according to the font of the document. For example, it is easy to read bold characters, and therefore a correction factor β less than 1 (for example, 0.95) is multiplied by the reproduction time obtained by the reproduction time calculation formula and the result is set as the final reproduction time for the document written in bold characters.

The slideshow reproduction process determining section 4 creates a reproduction table in which a document, an image or images associated with the document and the reproduction time of the document and the image(s) (including original layout information corresponding to each document and image, if any) are associated with each other and stores the reproduction table in the HDD 18. A document and an image can be associated with each other in an arbitrary way. Data indicating the association relation between an image and a document in the image-linked document data, for example a document and an image posted as a diary on a single day, are associated with each other. Alternatively, when a keyword (word) included in a document agrees with comment information or positional information included in auxiliary information of an image, the document is then associated with the image. Alternatively, a subject of an image is analyzed, and then if identification information of the subject (for example, the name of the subject) agrees with a keyword contained in a document, the document is then associated with the image. Characteristic data and a subject name obtained from a typical subject image (such as an owner of the camera, a famous sightseeing spot or an architecture) may be registered in advance into a database in the HDD 18 to identify the subject name corresponding to the characteristic data of the subject extracted in reference to the database for each image.

FIG. 3 shows an example of a reproduction table. In the reproduction table, the following are associated with each other: reproduction order; image-document combinations indicated by an image (or the identification information of the image, such as a JPEG file name) and a document (or the identification information of the document, such as a TXT file name); the number of characters in the document; and reproduction time of the image and the document identified by the identification information of the image and the document, respectively. The greater the number of characters the document has, the longer the reproduction time the image associated with the document has. Not every image needs to be associated with the document. For example, only basic reproduction time of 5 seconds is assigned to image No. 3. Note that each image may be associated with voice data to synchronize the reproduction of the image and the voice.

Referring to FIG. 2 again, in S5, the slideshow synthesizing section 5 stores an image or images, a document, and a reproduction table into the HDD 18 or other recording medium as a set of slideshow data.

In S6, the CPU 12 instructs the display section 6 to generate a video signal for sequentially reproducing the document and the image(s) just for the reproduction time based on the slideshow data. The display section 6 generates the video signal of the slideshow according to the instruction from the CPU 12 and outputs the signal to the display device 50. Accordingly, the document and the image are sequentially reproduced on the display device 50 according to the reproduction order and time defined in the reproduction table. Alternatively, the slideshow creating apparatus 100 itself does not necessarily reproduce the slideshow; that is, the video signal can be stored in a recording medium such as DVD or sent as streaming data to a desired electronic device which has got connected via the communication I/F 28.

Figure 4:
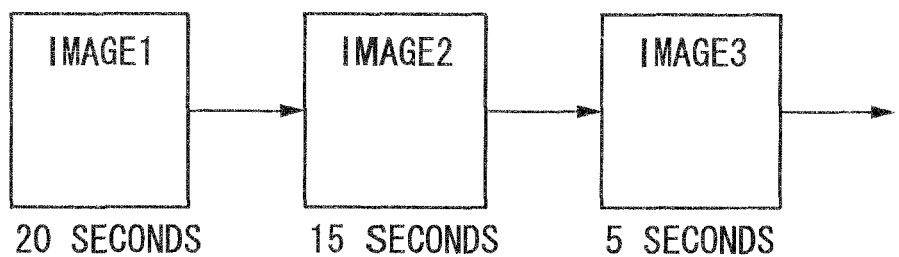
FIG. 4 is a block diagram of a storage site.

As shown in FIG. 4, the display-switching of combinations of an image and a document is sequentially performed along the elapse of reproduction time defined in the reproduction table. The display-switching, however, may be performed according to the operation from the operating section 23.

Figure 5:
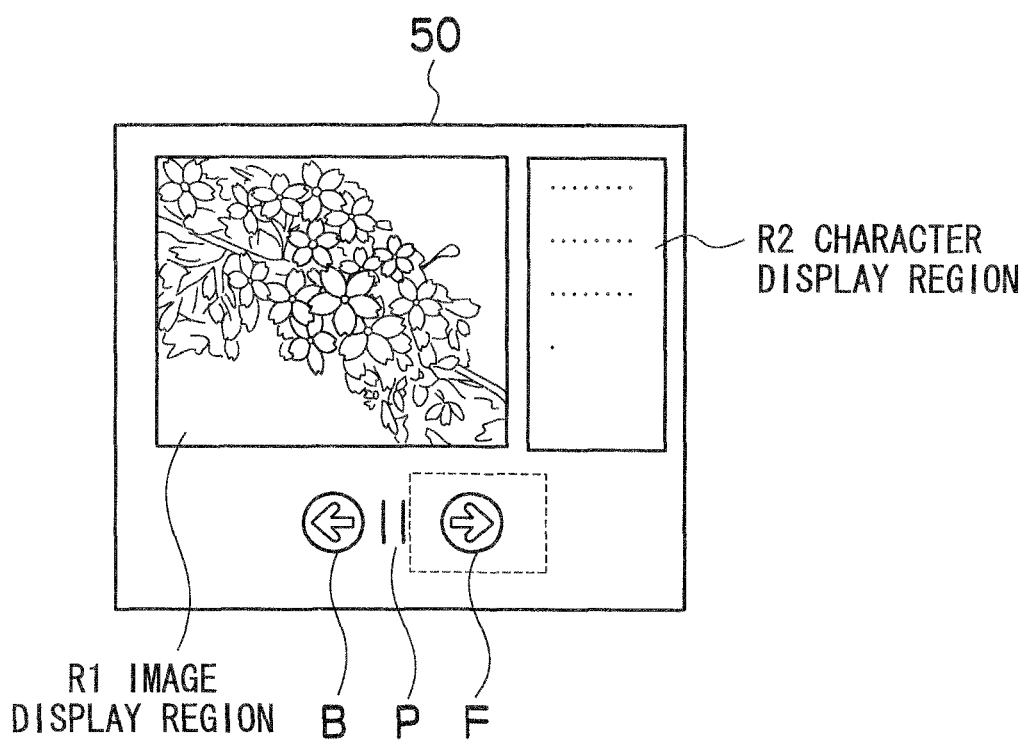
FIG. 5 is a schematic diagram showing a program executed in a storage site.

As shown in FIG. 5, for example, a "forward" button F, a "back" button B, and a "pause" button P are provided adjacent to an image display region R1 or to a character display region R2 which constitutes the slideshow. Pressing operation of each button is detected by the operating section 23. By clicking or touching each button with a cursor or pointer, the following instruction is inputted to the operating section 23: an instruction of "forward" for switching the image and/or document in the currently displayed order to the one(s) in the subsequent order in the slideshow; an instruction of "back" for switching the image and/or document in the currently displayed order to the one(s) in the previously displayed order in the slideshow; or an instruction of "pause" for keeping displaying the image and/or document in the currently displayed order in the slideshow.

The CPU 12 identifies each instruction inputted to the operating section 23 and controls the reproduction progress of the slideshow according to the instruction. More specifically, when the "forward" instruction is identified, the image and the document in the currently displayed order are switched to the one(s) in the subsequent order, when the "back" instruction is identified, the image and the document in the currently displayed order are switched to the one(s) in the previously displayed order, and when the "pause" instruction is identified, the image and the document in the currently displayed order are kept displaying. If no instruction to change the progress of the slide is inputted to the operating section 23, the slide reproduction progresses according to the reproduction table. Note that when the "forward" instruction is inputted, the reading speed of the user can be roughly identified. More specifically, the CPU 12 can identify time period from a starting time of the document display to an instruction input time based on the time information of the RTC 24 and calculate the number of readable characters per unit time of the user by dividing the number of characters in the document by this time period.

Moreover, the reproduction time may be changed according to the instruction identified. It is assumed that a user who inputs the "forward" instruction has fast speed to read a document and a user who inputs the "back" instruction has slow speed to read a document. Then, when the "forward" instruction is identified, for example, the reproduction time calculation formula of 'the slideshow reproduction time=the basic reproduction time(5)+the number of characters in the document×1' is changed to a formula of 'the slideshow reproduction time=the basic reproduction time(5)+the number of characters in the document×0.9.' In this way, a user who reads fast can switch the image and the document in a faster time period.

Alternatively, when the "back" instruction is identified, for example, the reproduction time calculation formula of 'the slideshow reproduction time=the basic reproduction time(5)+the number of characters in the document×1' is changed to a formula of 'the slideshow reproduction time=the basic reproduction time(5)+the number of characters in the document×1.1.' Alternatively, when the "pause" instruction is identified, for example, the reproduction time calculation formula of 'the slideshow reproduction time=the basic reproduction time(5)+the number of characters in the document× 1' is changed to a formula of 'the slideshow reproduction time=the basic reproduction time(5)+the number of characters in the document×1.05.' In this way, a user who reads slowly can switch the image and the documents in a slower time period, obtaining time to read slowly.

As described above, since the reproduction time of an image or images and a document according to the amount of the document associated with the image, a situation can be avoided in which when a long document is associated with an image, the image and the document are changed to the next before a user finishes reading the document.

Second Embodiment

In the first embodiment, when a large amount of document is associated with an image, the image and the document cannot be displayed concurrently on one screen of the display device 50. In this case, the document display region size could be reduced; however, it will cause the displayed document to be small pieces or the characters to be smaller, which is difficult to read. Therefore, layout information in which the display region size of an image and a document is adjusted according to the amount of the document is prepared so that the good visibility of the document can be kept.

Figure 6:
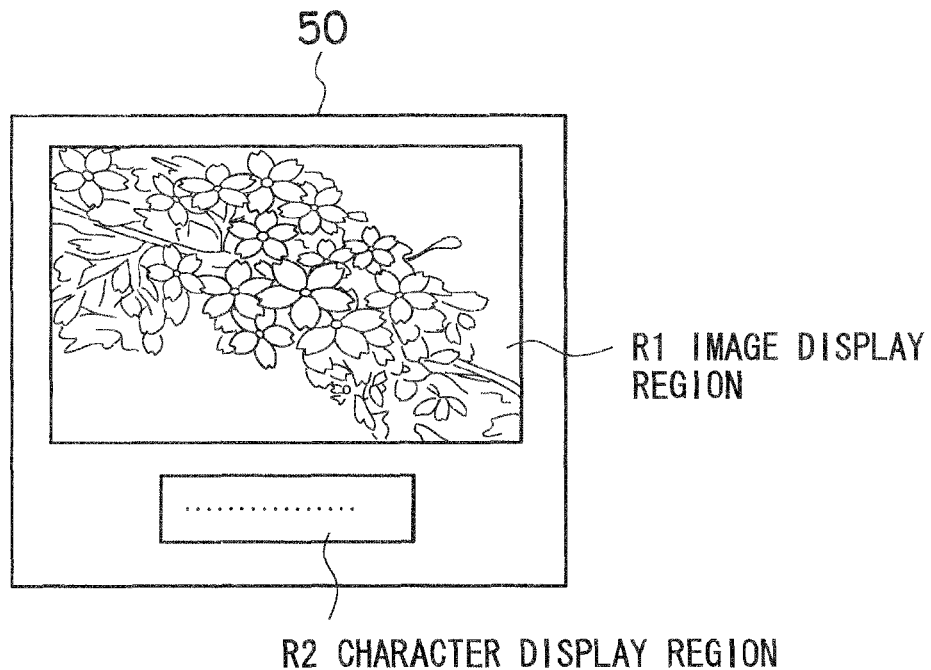
FIG. 6 is a diagram showing an example of an image size adjusted to fit a short comment.

As shown in FIG. 6, for example, when a document is composed of a small number (fifteen or so) of words, the display region R2 is adjusted to a size as small as possible required to display the document while the document keeps having one line and the predetermined font size (for example, 12 points). The image display region R1 is adjusted by cutting out the image to a size as large as possible to fit into an extra space except the display region R2 on one screen of the display device 50, either while the aspect ratio of the image is kept, or so that the image matches the aspect ratio of the extra space. As a result of that, the image display region R1 becomes relatively larger than the character display region R2 and therefore the visibility of the image can be increased without losing the visibility of the characters. The adjusted image display region size and the character display region size are associated with the image and the document to be displayed in the regions as adjusted layout information and stored in the reproduction table. At this time, original layout information is deleted from the reproduction table.

Figure 7:
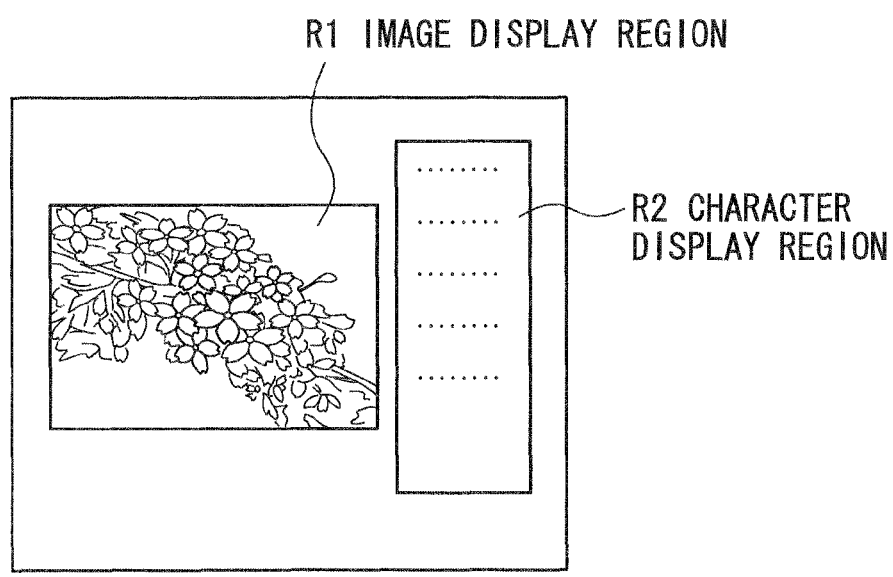
FIG. 7 is a diagram showing an example of an image size adjusted to fit a long comment.

Alternatively, as shown in FIG. 7, for example, when a document is a long piece having about thirty words, the display region R2 is adjusted to a size as small as possible required to display the document while the document keeps having about five lines and the predetermined font size (for example 12 points). The image display region R1 is adjusted to a size as large as possible to fit into an extra space except the character display region R2 on one screen of the display device 50 while the aspect ratio of the image is kept. Then, the image size is enlarged or reduced to fit into the image display region R1 and the resized image is positioned. The adjusted image display region size and the character display region size are associated with the image and the document to be displayed in the regions as the adjusted layout information and stored in the reproduction table. At this time, original layout information which conflicts with the adjusted layout information is deleted from the reproduction table. Original layout information which does not conflict with the adjusted layout information (such as a font color) is not deleted.

Alternatively, the image display region R1 may be set as an extra space except the display region R2 on one screen of the display device 50, and accordingly the image may be cut out with the aspect ratio adapted thereto and fitted into the display region R2. At this time, a trimming region may be set in the image so that the main subject is positioned at the central part of the image. Some parts of the image included in the trimming region may be cut out. The adjusted image display region size and the character display region size are associated with the image and the document to be displayed in the regions as the adjusted layout information and stored in the reproduction table. At this time, original layout information which conflicts with the adjusted layout information is deleted from the reproduction table. As a result of that, the character display region R2 becomes relatively larger than the image display region R1 and therefore the visibility of the characters can be increased without losing the visibility of the image.

Figure 8:
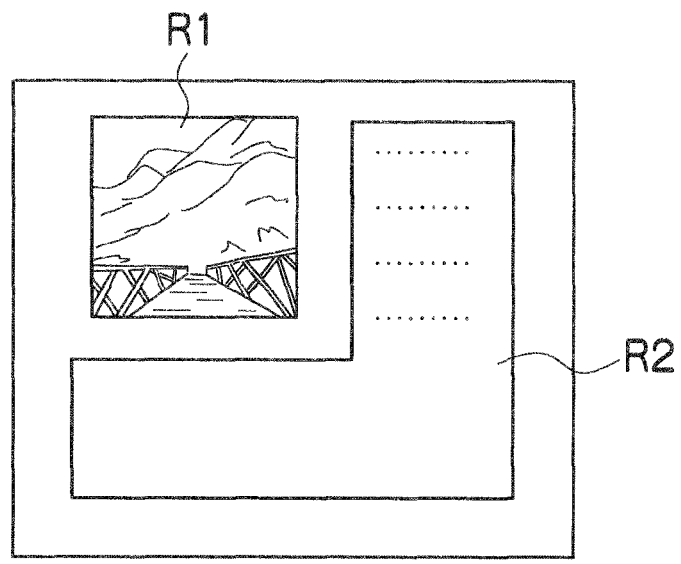
FIG. 8 is a diagram showing an example in which an extra space except an image display region is adjusted to be a character display region.

As shown in FIG. 8, first, the size of the image display region R1 may be adjusted according to the amount of the document, after that the extra space except the image display region R1 on one screen of the display device 50 may be set as the character display region R2. Then this character display region R2 may be stored in the reproduction table as the adjusted layout information. In this case, the need for adjustment of the aspect ratio of the image is eliminated.

Third Embodiment

Figure 9:
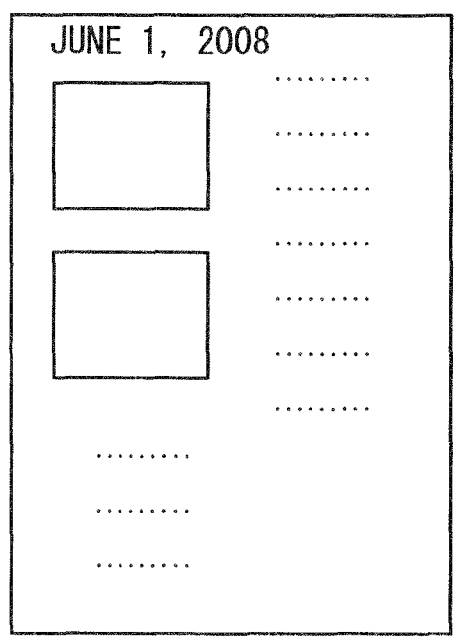
FIG. 9 is a diagram showing an example of a weblog.

In image-document linked data, such as a blog in the form of HTML, one document is not always associated with one image. For example, as a weblog (a diary like web page) shown in FIG. 9, several images may be arranged in a diary for a day.

Figures 10, 11:
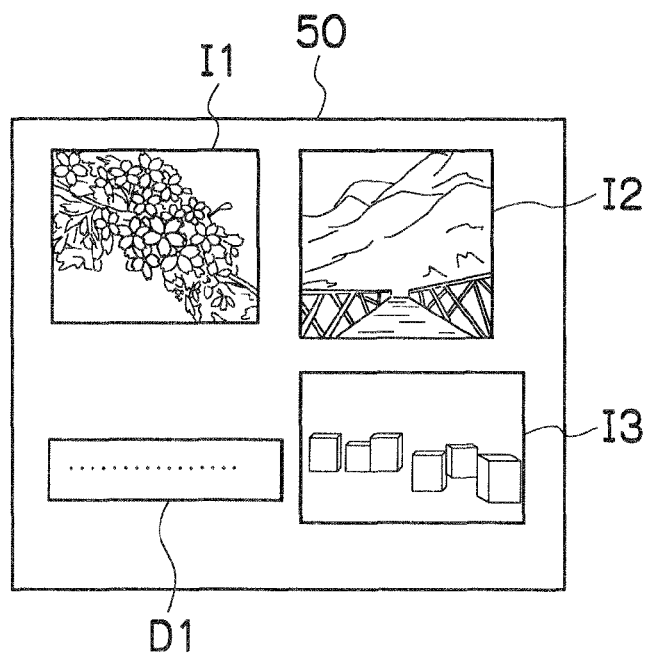
FIG. 10 is a diagram schematically showing an aspect in which documents (comments) are assigned to only some images in the weblog.
FIG. 11 is a diagram showing an example of a slideshow in which a short document and a plurality of images are displayed concurrently.

In addition, since it takes time and effort to give a document (comment) to every image, there may be cases in which a user gives a comment to (a) characteristic image(s) only. Alternatively, there may be cases in which no image is arranged in a diary for a day at all. When a reproduction specifying process table is created from such a blog, some images are associated with a comment, but some are not associated with a comment as shown in FIG. 10. Reproducing this table as it is, images accompanied with the document and images not accompanied with the document at all are arranged together, which does not look nice.

Therefore, rather than that a combination of an image or images and a document is limited to only the association of the image(s) and the document of the image-document linked data, an image or images to be displayed with a comment on the same screen (concurrently-displayed image) is determined according to an amount of the comment, and then this concurrently-displayed image and the comment are displayed in the same screen. This adjusted image arrangement on the same screen is associated with the image(s) and the document to be displayed on the same screen as the adjusted layout information and stored in the reproduction table. At this time, original layout information which conflicts with the adjusted layout information is deleted from the reproduction table.

For example, as shown in FIG. 11, when an image I1 (an image associated with a specific document with the image-document linked data, i.e., a linked image) and a document D1 are displayed in the same screen, if the document D1 is a short piece having about fifteen words, images I2 and I3 which are not associated with the document D1 (non-linked image) are also displayed in the same screen.

Figures 12, 13:
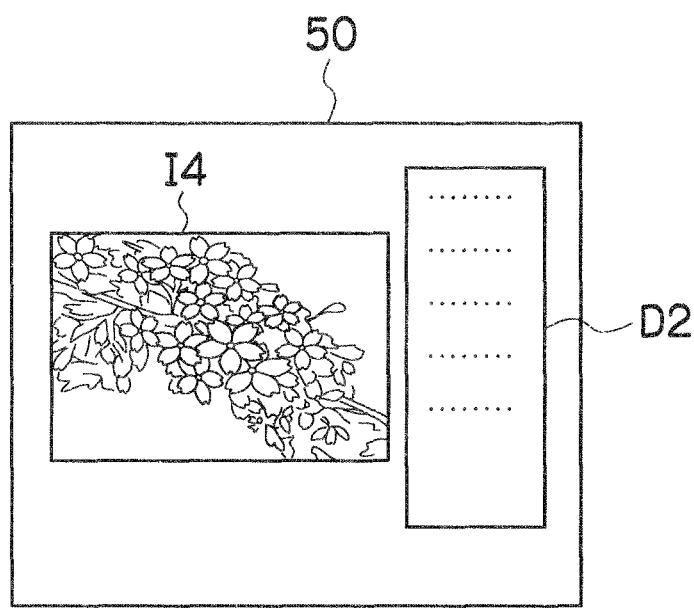
FIG. 12 is a diagram showing an example of a slideshow in which a long document and an image are displayed concurrently.
FIG. 13 is a diagram showing an example of a table for the number of images.

On the other hand, as shown in FIG. 12, when a linked image I4 and a document D2 are displayed in the same screen, if the document D2 is a long piece having about thirty words, the non-linked images I2 or I3 which is not associated with the document D2 is not displayed, and only the document D2 and the image I4 which are associated with the image-document linked data are displayed.

The length of the document and the number of images to be displayed on the same screen may be defined in advance with a table. For example, as shown in FIG. 13, a table for the number of images is defined according to the setting operation from the operating section 23 and stored in the HDD 18 and the like, the table defining the length of character strings associated with an image and the number of images which can be displayed on one screen along with the image and the character strings. The CPU 12 then identifies the number of images (the number of images to be displayed) to be accompanied with the image according to this table.

Any of the non-linked images not associated with the document D1 may be arbitrarily selected to satisfy the number of images to be displayed (including the image associated to the document) for displaying along with the linked image. For example, the slideshow synthesizing section 5 sorts the linked image and the non-linked images in alphabetical order or in Japanese alphabetical order and then selects non-linked images from the ones having the sorted order close to the sorted order of the linked image until the number of images to be displayed is reached. Alternatively, the slideshow synthesizing section 5 selects non-linked images having information about a photographing date close to information about a photographing date included in the auxiliary information of the linked image associated with the document D1, or non-linked images having information about a photographing site (such as coordinate information received from a GPS satellite at a photographing time or text information indicating a photographing site) close to information about a photographing site included in the auxiliary information until the total number including the number of linked images and non-linked images reaches the number of images to be displayed. The slideshow synthesizing section 5 then updates the reproduction table to associate the selected non-linked images with the linked image and the document.

In this way, a slideshow can be created while avoiding a situation in which only a short document and an image or images associated with the document are displayed on one screen with much blank space that does not look very nice.

Forth Embodiment

Simply displaying a document and a linked image for the same time period reduces the interest in the slideshow in that images are changed from one to another for display, since the same image keeps being displayed for a long time especially when the document is long.

Figure 14:
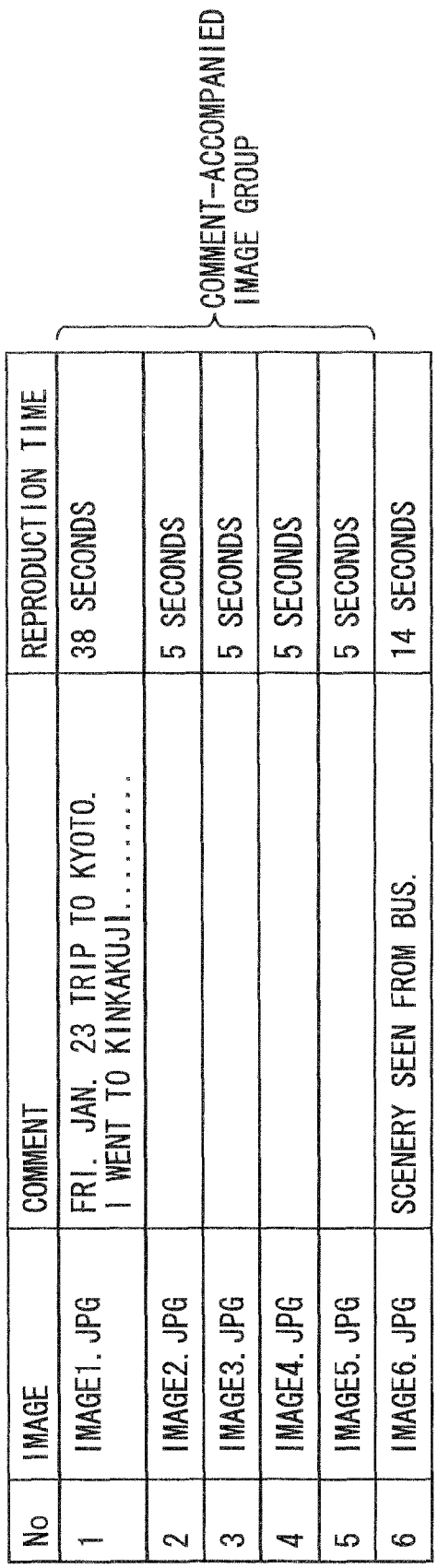
FIG. 14 is a diagram showing an example of a reproduction table in which one image reproduced in association with one document and a plurality of images reproduced not in association with any document are defined.

For example, as shown in FIG. 14, reproduction time of a linked image "image1.jpg" is determined according to the reproduction time calculation formula of the first embodiment. Since "image1.jpg" is associated with a long document, the reproduction time is as long as 38 seconds. The reproduction time of any of the non-linked images "image2.jpg," "image3.jpg," "image4.jpg," and "image5.jpg" is the basic reproduction time, that is 5 seconds each. In this slideshow, only the first image is displayed for a quite long time, and the rest of the images are changed from one to another for a short time without any document, and thereby the display time periods of images are not well balanced.

Therefore, when the reproduction time is determined according to the length of the document, if the reproduction time is longer than the predetermined threshold (for example, 30 seconds or more), the display is switched from the linked image to the non-linked image(s) within the reproduction time. Thereafter, the display is periodically switched from the non-linked image(s) to other linked image(s) until the reproduction time elapses.

For example, assume that the reproduction time of a document associated with a linked-image "image1.jpg" is determined to be 38 seconds according to the reproduction time calculation formula of the first embodiment. The slideshow synthesizing section 5 determines whether the reproduction time of the document determined according to the reproduction time calculation formula of the first embodiment is longer than the predetermined threshold (for example, 30 seconds) or not. The reproduction time of 38 seconds is longer than the predetermined threshold of 30 seconds. In this case, the slideshow synthesizing section 5 divides the reproduction time of the linked image into some predetermined periods of divided reproduction unit time, and stores the unit time in the reproduction table as a new reproduction time of the linked image. In a slideshow creating apparatus, the linked images or the non-linked images are changed and displayed as each divided reproduction unit time elapses according to the table.

The divided reproduction unit time can be determined in an arbitrary way. For example, the slideshow synthesizing section 5 defines images including the linked image, an image or images following the linked image and prior to the next linked image in order of reproduction (in order of file name or photographing date or the like) as a comment-accompanied image group. Next, the slideshow synthesizing section 5 calculates the total number N of images included in the comment-accompanied image group, and then divides the reproduction time of the sentence by N. The obtained value is set as the divided reproduction unit time.

In FIG. 15, there are the linked image "image1.jpg," and following non-linked images "image2.jpg," "image3.jpg," "image4.jpg," and "image5.jpg" before the linked image "image 6.jpg" in order of reproduction. Therefore the comment-accompanied image group consists of "image1.jpg," "image2.jpg," "image3.jpg," "image4.jpg," and "image5.jpg," resulting in N=5. Accordingly, the divided reproduction unit time=38/5=7.6 seconds. However, when the RTC 24 cannot calculate after the decimal point, the slideshow synthesizing section 5 may perform rounding, such as a round off, round up, and round down to the number of decimals of the divided reproduction unit time. Here, the number of decimals of the divided reproduction unit time is rounded up to be 8 seconds.

When N increases, however, the divided reproduction unit time per image shortens, so that the images are changed rapidly from one to another. Therefore, the slideshow synthesizing section 5 may set the upper limit of non-linked images included in the comment-accompanied image group based on input to the operating section 23 or the factory preset data of the ROM 21 not to include any non-linked image which exceeds the upper limit in the comment-accompanied image group. For example, if there is an image "image5-1.jpg" between "image5.jpg" and "image6.jpg" in order of the reproduction and if "image5-1.jpg" is included in the comment-accompanied image group, N is to be 6. Therefore, when the upper limit of the non-linked image=4, the slideshow synthesizing section 5 does not include "image5-1.jpg" in the comment-accompanied image group.

The CPU 12 causes the linked-image and the document to be displayed until the first divided reproduction unit time elapses. After that, when the next divided reproduction unit time starts, a non-linked image is displayed while the document is still being displayed. Subsequently, the CPU changes non-linked images every time each divided reproduction unit time elapses. Any non-linked image to be displayed in the second order or later in a divided reproduction unit time may be selected in an arbitrary way as long as the non-linked image is included in the comment-accompanied image group.

For example, non-linked images are repeatedly displayed, starting with the linked image, in Japanese alphabetical order of image file names in the comment-accompanied image group, in alphabetical order of the image file names, or in order of photographing date, or non-linked images randomly selected one at a time from the comment-accompanied image group are repeatedly displayed with the comment until all periods of the divided reproduction unit time elapse. During this time, only images are changed while the comment keeps being displayed.

Figures 16, 17:
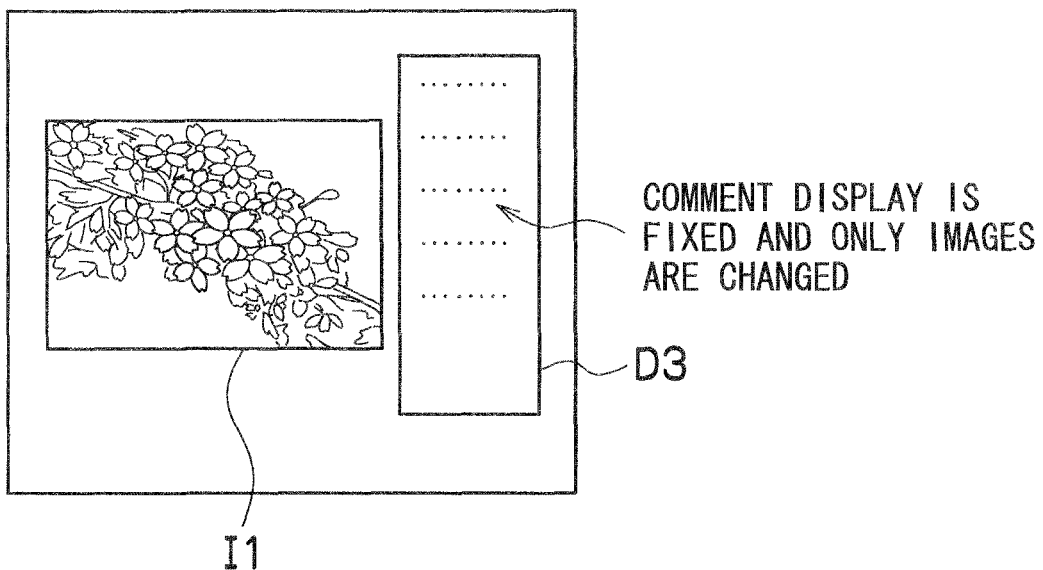
FIG. 16 is a diagram showing a slideshow in which images are sequentially reproduced in association with one document.
FIG. 17 is a diagram showing an example of a reproduction table in which a plurality of images is associated with a long document.

For example, in FIG. 16, a document D3 and a linked image I1 ("image1.jpg") associated with the document D3 are currently displayed. After the first divided reproduction unit time has elapsed, the next non-linked image ("image2.jpg) is displayed while the document D3 is still being displayed. Thereafter, every time a divided reproduction unit time elapses, "image3.jpg," "image4.jpg," and "image5.jpg" are displayed. Until all periods of the reproduction unit time elapse, the document D3 keeps being displayed. In this way, a situation can be avoided in which the same image remains displayed for a long time due to long comment display.

Fifth Embodiment

In the forth embodiment, when uniform display time is assigned to each non-linked image that constitutes the comment-accompanied image group, a next image can be displayed before a user has finished reading a comment portion associated with the previous image, or an image can be displayed which is associated with a comment portion a user has already read. Such situation is inconvenient to the user. In this embodiment, an image associated with a comment portion where a user is actually reading is displayed.

For example, a reading speed obtained by the calculation or the input operation for user's reading speed as described above is set. Next, a sentence is displayed along with the linked image, and then the user's current reading point in the sentence corresponding to the elapsed time from the sentence display starting time is calculated by measuring the elapsed time from the sentence display starting time. For example, if a user has a reading speed of 400 words/min and the elapsed time from the sentence display starting time is 1 minute, then the current reading point is the $400^{th}$ word from the beginning of the document.

The first meaningful element located at the current reading point or later, for example, a word, phase, clause, or sentence is identified. Here, a word will be identified for simplification. A non-linked image having auxiliary information associated with the identified word is then specified, and the display is changed to the specified non-linked image.

For example, assume that a user who has a reading speed of about 2 words/second reads a sentence "on Fri, January 23 trip to Kyoto. I went to Kinkakuji . . . I went to Ginkakuji . . . " of an image-linked document data, as shown in FIG. 10.

In this case, this user can finish reading the portion of "on Fri, January 23 trip to Kyoto." at the time 6 seconds have elapsed since he/she started reading from the beginning of the sentence. Also this user can finish reading the portion of "I went to Kinkakuji . . . " at the time 6+21 seconds have elapsed since he/she started reading from the beginning of the sentence. Further, this user can finish reading the portion of "I went to Ginkakuji . . . " at the time 6+21+11 seconds have elapsed since he/she started reading from the beginning of the sentence.

At the time this user's current reading point in the document reaches "Kin" of the "Kinkakuji" which is the first word in the following sentence, specifically, at the time 6 seconds have elapsed since he/she started reading from the beginning of the sentence, the non-linked image containing "Kinkakuji" as photographing site information of an Exif tag is specified, the reproduction table is then updated so that the specified non-linked image is set to be a linked image associated with "I went to Kinkakuji . . . . " Alternatively, when the current reading point reaches "Gin" of the "Ginkakuji", the non-linked image containing "Ginkakuji" as photographing site information of an Exif tag is specified, the specified non-linked image is set to be a linked image associated with "I went to Ginkakuji . . . . "

As a result of that, the reproduction table as shown in FIG. 18 is created and stored in the HDD 18.

Figures 19, 20:
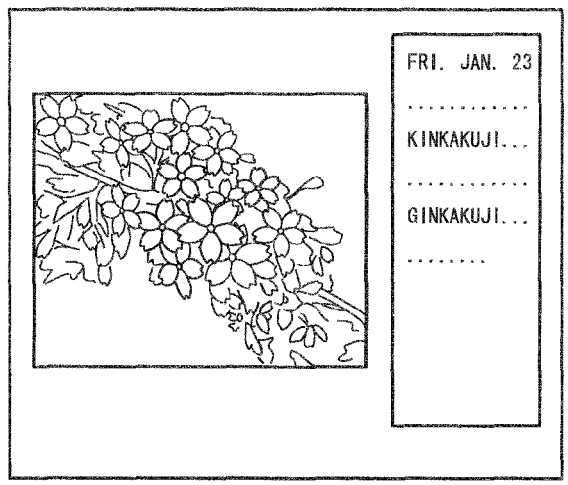
FIG. 19 is a diagram showing an example in which images are changed based on reading points of a sentence.
FIG. 20 is a diagram showing an example of combination data that associates one long comment with a plurality of images.

As shown in FIG. 19, the images displayed according to the table in the slideshow are changed based on the reading point in the sentence with a specific reading speed. At this time, predetermined visual effects, such as a color change, boldface, or underline may be imparted to a meaningful element corresponding to the current reading point.

In this way, a user can obtain the timing of changing images associated with the portion being read, so that the user can consciously adjust the reading speed according to the image display change. Incidentally, there is a prior art of music apparatuses and the like in which a visual effect is imparted to lyrics displayed on a screen according to the progress of musical accompaniments. Note that while the speed of the musical accompaniments is constant, the present application is significantly different from the above prior art in that the timing the visual effect appears varies according to the user's reading speed.

In addition, instead of predicting the reading point using the reading speed, a user may input the actual reading point and the image associated with the document portion located at the input point may be displayed. For example, a touch panel mounted on the display device 50 is provided as the operating section 23, causing the user to specify the current reading point in the document displayed by pressing operation with the user's finger or a stylus pen. This operation for the reading point does not give any particular uncomfortable feeling to the user because this operation is similar to a movement done by the user in tracing sentences while reading. The CPU 12 then identifies an image corresponding to the meaningful unit (a word, clause, sentence) of the reading point currently being pressed from the reproduction table (for example, one shown in FIG. 18) stored in the HDD 18, and causes the display device 50 to display the image.

Sixth Embodiment

In the fifth embodiment, when the length of the sentence included in the image-linked document data is longer than a certain length, the document may be divided so that the length of the sentence is shorter than the certain length.

For example, as shown in FIG. 20, a sentence of "on Fri, January 23 trip to Kyoto. I went to Kinkakuji . . . I went to Ginkakuji . . . I ate XXX for lunch . . . " is associated to a linked image "image1.jpg" having the reproduction order "1". Each reproduction order of non-linked images "image2.jpg," "image3.jpg," "image4.jpg," and "image5.jpg" is to be "2" to "5."

When these images are reproduced according to the reproduction table shown in FIG. 17 of the sixth embodiment, the sentence keeps being displayed while "image1.jpg" through "image5.jpg" are displayed. However, a long sentence displayed for a long time makes line spacing tight, and it is not easy to read the sentence.

Therefore, the slideshow synthesizing section 5 first cuts one document contained in the image-linked document data at a point (cutting point) into a plurality of documents and thus obtains a plurality of document fragments. The document fragments are stored in the reproduction table as new documents. At this time, the original document before being cut is replaced with each document fragment. Document fragments can be generated in an arbitrary way and any number of document fragments can be generated. For example, one document is equally divided into two documents each having the same number of words. When a document is simply divided regardless its meaning, it is not easy to read the document. Therefore, a document may be cut at the end of a sentence closest to the halfway point of the document where each of the document fragments has the same number of words. In this example, assume that the first document fragment of "on Fri, January 23 trip to Kyoto. I went to Kinkakuji . . . I went to Ginkakuji . . . " and the second document fragment of "I ate XXX for lunch . . . " are generated. However, when document fragments are generated in a very small unit, it is not easy to read them because many short documents are displayed. Therefore, the minimum unit of a document fragment may preferably be one sentence.

Each single reproduction order is assigned to each document fragment according to the cutting points. Here, reproduction order "1" is assigned to the first document fragment because the first document fragment includes a sentence before the cutting point and reproduction order "2" is assigned to the second document fragment because the second document fragment includes a sentence after the cutting point.

Meanwhile, the slideshow synthesizing section 5 generates the same number of subgroups as the number of the document fragments from the comment-accompanied image group associated with the document before being divided.

Subgroups can be generated in an arbitrary way; however, the number of subgroups and the number of document fragments should be the same. For example, two document fragments are obtained by the division based on the reproduction order according to the cutting points. When the last sentence of the first document fragment includes "I went to Ginkakuji", a subgroup in which the first linked image has the first reproduction order and the non-linked image "Ginkakuji.jpg" having "Ginkakuji" as photographing site information has the last reproduction order is set as the first subgroup. Then, after excluding the first subgroup from the comment-accompanied image group, the rest of the image group is set as the second subgroup. The number of images included in a subgroup is not limited to two or more, and can be one.

Each single reproduction order is assigned to each subgroup according to the cutting points. Here, reproduction order "1" is assigned to the first subgroup because the first subgroup includes an image "kyoto.jpg" associated with the first document fragment. Reproduction order "2" is assigned to the second subgroup because the second subgroup includes an image "lunch.jpg" associated with the second document fragment.

Figures 21, 22:
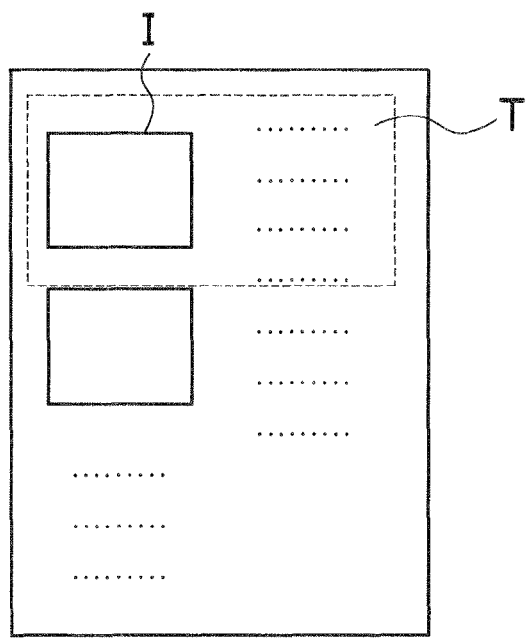
FIG. 21 is a diagram showing an example of combination data that associates comments after being divided with images.
FIG. 22 is a diagram showing an example of images of a web page and a document layout.

By associating a document fragment and a subgroup each having the same reproduction order, a reproduction table is created. As a result of that, the reproduction table as shown in FIG. 21 is stored in the HDD 18.

In this way, a document can be easily read by cutting a long sentence into short pieces for display. At this time, the association relation between the document before being divided and the image group is still maintained even after the document has been divided. Therefore, the association between the details of the image(s) and of the document is not lost even after the document has been divided, so that a user can still effectively recall their memories by visually recognizing the document and the image(s) concurrently.

Seventh Embodiment

Layout information of an image or images and a sentence included in the image-linked document data may be used to determine the association between the image(s) and the document in the slideshow.

For example, as shown in FIG. 22, an image I arranged at the closest position to a sentence T is recognized as the image associated with the sentence T, thereby setting the image I to be a linked image of the sentence T. Specifically, for example, in grid cells arranged in rows and columns defined by a table tag, the document and the image located in the adjacent cells are associated with each other.

Unlike an img alt attribute in a HTML document, a title tag or a body tag cannot be information to directly associate a document and an image in the same web page. Thus, there may be cases in which the direct association of a document and an image is not defined in a web page. Even in this case, however, the direct association of the image and the document can be defined based on the layout information.

Moreover, layout information of an image or images and a sentence included in the image-linked document data may be used to determine the display order of the image(s) and the document in the slideshow. For example, when a horizontal writing document is defined by a style sheet, the display order is assigned, in ascending order, from the image or the document arranged at the top of the web page.

Note that original layout information of an image or images and a document, such as a document font, document color, an image display size, and a character size may be used as display attribute information of the image(s) and the document in the slideshow. In this way, the characters and the image(s) having the same font, size, and color as font, size, and color of the original data in the web page and the like are reproduced in the slideshow. Therefore, the visual similarity between the original data and the slideshow can be maintained.

Although in the embodiments described above, an image has been described as still image data, the image does not need to be still image data and can be moving image data because the key point of the present invention is the synchronous reproduction of an image and a document. Also both of the moving image and the still image may be used together in the present invention. In order to reproduce a moving image, information which serves to identify the moving image, such as a file name or a truck number of the moving image data may be stored in the reproduction table (see FIG. 3) as identification information of the image.

What is claimed is:

1. An apparatus comprising:
one or more processing devices;
a content acquiring section that acquires still image contents;
a document acquiring section that acquires documents;
an association data creating section that creates combination data defining a combination of a still image content and a document to be synchronized for reproduction in a single screen, out of the still image contents acquired by the content acquiring section and the documents acquired by the document acquiring section;
a reproduction time determining section that determines reproduction order and a single reproduction time of a still image content document combination defined by the combination data created by the association data creating section; and
a reproduction control data creating section that creates reproduction control data describing the combination data, and the reproduction order and the single reproduction time of the still image content-document combination defined by the combination data,
wherein the document acquiring section acquires original display layout information of the document including at least one of a font of the document and a font size of the document, the font of the document and the font size of the document remaining unchanged after reproduction of the still image content-document combination defined by the combination data, and
wherein the reproduction time determining section determines the single reproduction time of the still image content-document combination defined by the combination data according to the original display layout information.

2. The apparatus according to claim 1, wherein
the reproduction time determining section includes:
a document reproduction time determining section that determines reproduction time of a document acquired by the document acquiring section according to an amount of the document; and
a content reproduction time determining section that determines reproduction time of a still image content acquired by the content acquiring section, and
the content reproduction time determining section determines a reproduction starting time of each of the still image contents in combination with the document to be a desired time within the reproduction time of the document.

3. The apparatus according to claim 2, further comprising:
a content association word setting section that sets an association relation between each word in the document and each still image content; and
a reading speed setting section that sets a reading speed of the document, wherein
the content reproduction time determining section calculates a time duration in which a reading point reaches each word in the document based on the reading speed set by the reading speed setting section and then sets the reproduction starting time of each still image content associated with each word in the document set by the content association word setting section to be the time at which the reading point reaches the word.

4. The apparatus according to claim 3, wherein
the content association word setting section sets an association between a still image content with auxiliary information and a word in the document in common with the auxiliary information.

5. The apparatus according to claim 1, comprising a document dividing section that divides the document acquired by the document acquiring section into a plurality of documents having words less than a predetermined threshold number of words, when the document has words no less than the predetermined threshold number of words.

6. The apparatus according to claim 1, wherein
the document acquiring section acquires the document from content-document display data defining a display layout of the document and the still image content, and
the content acquiring section acquires the still image content whose display layout is defined by the content-document display data.

7. The apparatus according to claim 6, wherein the display layout of the document and the still image content is described in a markup language.

8. The apparatus according to claim 6, wherein the association data creating section creates combination data defining a combination of a still image content and a document according to a positional relation on the display layout of the still image content and the document defined by the content-document display data.

9. The apparatus according to claim 6, wherein the reproduction control data includes information about the display layout defined by the content-document display data.

10. The apparatus according to claim 9, wherein the information about the display layout includes at least one of a display size of the still image content, a display position of the still image content, a display region size of the document, a character size, a font of the document, and a color of the document.

11. The apparatus according to claim 1, further comprising a layout determining section that determines a display layout of the content-document combination defined by the combination data and outputs layout information indicating the determined display layout, wherein the reproduction control data creating section creates reproduction control data in which the combination data, and the reproduction order and the reproduction time of the content-document combination defined by the combination data, and the layout information are associated with each other.

12. The apparatus according to claim 11, wherein the layout determining section determines a display size of the content-document combination defined by the combination data according to an amount of the document associated with each still image content defined by the combination data.

13. The apparatus according to claim 12, wherein the association data creating section determines one or more still image contents to be associated with the document according to the amount of the document and then creates combination data defining a combination of the document and the one or more still image contents to be associated with the document.

14. The apparatus according to claim 1, further comprising a reproduction section that sequentially reproduces each still image content and each document according to the reproduction order and the reproduction time of the reproduction control data.

15. A computer implemented method comprising:
acquiring, by a computer system, a still image content;
acquiring, by the computer system, a document;
creating, by the computer system, combination data defining a combination of a still image content and a document to be synchronized for reproduction in a single screen, out of the acquired contents and the acquired documents;
determining, by the computer system, reproduction order and a single reproduction time of a content-document combination defined by the created combination data;
creating, by the computer system, reproduction control data describing the combination data, and the reproduction order and the single reproduction time of the content-document combination defined by the combination data; and
acquiring original display layout information of the document including at least one of a font of the document and a font size of the document, the font of the document and the font size of the document remaining unchanged after reproduction of the content-document combination defined by the combination data;
determining, by the computer system, the single reproduction time of each content-document combination defined by the combination data according to the original display layout information and an amount of the document associated with each still image content defined by the combination data, the content-document combination being reproduced at the single screen according to the determined single reproduction time.

16. A non-transitory recording medium containing thereon computer readable code when executed by a computer causes the computer to perform a method comprising:
acquiring a still image content;
acquiring a document;
creating combination data defining a combination of a still image content and a document to be synchronized for reproduction in a single screen, out of the acquired still image content and the acquired document;
determining reproduction order and a single reproduction time of a content-document combination defined by the created combination data;
creating reproduction control data describing the combination data, and the reproduction order and the single reproduction time of the content-document combination defined by the combination data;
acquiring original display layout information of the document including at least one of a font of the document and a font size of the document, the font of the document and the font size of the document remaining unchanged after reproduction of the content-document combination defined by the combination data; and
determining the single reproduction time of each content-document combination defined by the combination data according to the original display layout information and an amount of the document associated with each still image content defined by the combination data, the content-document combination being reproduced at the single screen according to the determined single reproduction time.

* * * * *